(12) United States Patent
Özer et al.

(10) Patent No.: US 7,707,390 B2
(45) Date of Patent: Apr. 27, 2010

(54) INSTRUCTION ISSUE CONTROL WITHIN A MULTI-THREADED IN-ORDER SUPERSCALAR PROCESSOR

(75) Inventors: Emre Özer, Cambridge (GB); Vladimir Vasekin, Cambridge (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 435 days.

(21) Appl. No.: 11/790,483

(22) Filed: Apr. 25, 2007

(65) Prior Publication Data

US 2008/0270749 A1 Oct. 30, 2008

(51) Int. Cl.
G06F 9/00 (2006.01)
(52) U.S. Cl. .................................. 712/214; 712/216
(58) Field of Classification Search ........................ None
See application file for complete search history.

(56) References Cited

U.S. PATENT DOCUMENTS

| 6,167,503 | A * | 12/2000 | Jouppi | 712/23 |
|---|---|---|---|---|
| 6,212,623 | B1 * | 4/2001 | Witt | 712/216 |
| 7,441,101 | B1 * | 10/2008 | Steiss et al. | 712/205 |
| 2001/0056456 | A1 * | 12/2001 | Cota-Robles | 709/103 |
| 2003/0126416 | A1 * | 7/2003 | Marr et al. | 712/235 |
| 2004/0172631 | A1 * | 9/2004 | Howard | 718/100 |
| 2004/0215947 | A1 * | 10/2004 | Ward et al. | 712/245 |
| 2004/0216105 | A1 * | 10/2004 | Burky et al. | 718/100 |
| 2006/0101241 | A1 * | 5/2006 | Curran et al. | 712/215 |
| 2006/0149904 | A1 * | 7/2006 | Mowry | 711/137 |
| 2007/0088934 | A1 * | 4/2007 | Arakawa | 712/214 |

\* cited by examiner

*Primary Examiner*—Eric Coleman
(74) *Attorney, Agent, or Firm*—Nixon & Vanderhye P.C.

(57) ABSTRACT

A multi-threaded in-order superscalar processor 2 is described having a fetch stage 8 within which thread interleaving circuitry 36 interleaves instructions taken from different program threads to form an interleaved stream of instructions which is then decoded and subject to issue. Hint generation circuitry 62 within the fetch stage 8 adds hint data to the threads indicating that parallel issue of an associated instruction is permitted with one of more other instructions.

37 Claims, 6 Drawing Sheets

| Issue Possibilities | Issue Slot 0 | Issue Slot 1 | Data-dependency Cross-check Required? |
|---|---|---|---|
| 1 | T0 | T0 | Yes |
| 2 | T0 | T1 | No |
| 3 | T1 | T0 | No |
| 4 | T1 | T1 | Yes |
| 5 | T0 | None | No |
| 6 | None | T0 | No |
| 7 | T1 | None | No |
| 8 | None | T1 | No |

Fig. 8

INSTRUCTION ISSUE CONTROL WITHIN A MULTI-THREADED IN-ORDER SUPERSCALAR PROCESSOR

BACKGROUND OF THE INVENTION

1. Field of the Invention

This invention relates to the field of data processing systems. More particularly, this invention relates to the field of instruction issue control, and the processing associated therewith, for multi-threaded in-order superscalar processors.

2. Description of the Prior Art

It is known to provide multi-threaded superscalar processors for reasons including increasing instruction execution throughput. Most known multi-threaded superscalar processors are out-of-order machines such as the Intel Pentium4, IBM Powers and Compaq Alpha 21464 microprocessors. Typically such out-of-order superscalar processors keep separate issue queues for different instruction types, such as branch, ALU and memory access instructions. Instructions that are ready to be issued are issued to the corresponding execution unit from the separate queues. Techniques such as register renaming are used to increase the ability to issue multiple instructions in parallel without generating data hazards and to support the pipelined nature of the execution units. The control of the issue of instructions in such out-of-order systems is highly complex and the issue stage will often comprise a large number of gates, consume considerable power and give rise to speed limiting critical paths. Nevertheless, when maximum instruction execution throughput is the overriding priority, the overhead of supporting such complexities within the issue stage are justified.

It is also possible to apply multi-threaded processing to in-order superscalar processors. Following the program order within each thread, and accordingly accepting the static scheduling of the instructions imposed by the programmer when writing the program, significantly simplifies the overhead associated with the issue stage of the instruction pipeline. Multi-threaded execution using the superscalar execution mechanisms permitting multiple instructions to execute in parallel may nevertheless be supported to increase performance with multiple program threads executing in parallel and the program order being followed within each of those threads. Processors following this model may have a better combination of features such as performance, complexity, cost, power consumption and the like for certain applications, e.g. mobile processing applications where a high power consumption resulting in a short battery life is undesirable. One known multi-threaded in-order superscalar processor is the Porthos network packet processor having 32-thread support and capable of scheduling three instructions to the functional units in parallel. A discussion of the Porthos processor can be found in S. Melvin, M. Nemirovsky, E. Musoll, J. Huynh, R. Milito, H. Urdaneta and K. Saraf, "A Massively Multi-threaded Packet Processor", *Workshop on Network Processors held in conjunction with The 9th International Symposium on High-Performance Computer Architecture*, Feburary 2003.

The Porthos processor issues at most one instruction from one thread at a time and this can adversely impact the overall performance in certain cases. For example, if only one thread is ready to issue instructions at a time, then only one instruction at a time can be issued even though there are two other issue slots available. This simplification in the Porthos processor allows a simplified issue stage to be formed since it reduces the requirement for data hazard checking and other forms of checking and the control necessary when more aggressive issue is performed in a manner seeking to increase performance by issuing as many instructions as possible in parallel even when they may originate from the same thread and accordingly require significant data hazard and other checking before issue.

It is desirable to maintain the simplicity and speed of a multi-threaded in-order superscalar processor relative to the out-of-order processors. Nevertheless, it is desirable to be able to support relatively aggressive instruction issue control so as to increase instruction throughput whilst not rendering the issue stage within the instruction pipeline a performance limiting part of the overall design, such as by introducing one or more critical paths within a complex issue stage capable of supporting aggressive instruction issue control. Furthermore, reducing the circuit overhead associated with instruction issue control whilst still achieving a good degree of performance is desirable.

SUMMARY OF THE INVENTION

Viewed from one aspect the present invention provides a multi-threaded in-order superscalar processor having an instruction pipeline comprising:

a plurality of fetched instruction queues in to which fetched instructions from respective program threads are placed; an issue stage responsive to instructions to select one or more of said instructions to be issued in parallel to respective execution units; and thread interleaving circuitry disposed outside and upstream of said issue stage in said instruction pipeline and coupled to said plurality of fetched instruction queues to receive therefrom instructions from different respective program threads and to form an interleaved stream of instructions from therefrom, said interleaved stream of instructions being supplied to said issue stage.

The present technique recognises that the step of interleaving instructions from different program threads can be performed upstream of the issue stage within the instruction pipeline. This significantly unburdens the issue stage and helps avoid the issue stage becoming performance constraining with respect to overall system performance.

Since the instructions have been interleaved upstream of the issue stage, it is possible for the issue stage to have an interleaved instruction queue rather than having to provide separate instruction queues for the instructions from the different threads. This reduces the hardware overhead associated with the issue stage.

The interleaving circuitry forms the interleaved stream of instructions that can issue in parallel by selecting instructions from different ones of the fetched instruction queues in accordance with a selection sequence. The selection sequence can be controlled in a variety of different ways. If the fetched instruction queue for a particular thread is empty, then selecting instructions from that thread can be bypassed and the slots within the interleaved instruction queue used by instructions from different threads. If one thread has a higher priority than another thread, then this may be reflected in the selection sequence such that if instructions are available for both threads, a higher proportion of instructions will be selected from the higher priority of the two threads such that the instructions from that higher priority thread will be executed more frequently by the execution units downstream and achieve higher performance for the higher priority thread.

The thread interleaving circuitry can be disposed at a variety of positions upstream of the issue stage, but is particularly well suited for location within the fetch stage.

It will be appreciated that the present technique can be applied to systems having different capabilities for how many instructions they can issue in parallel. A simple system may be capable of issuing up to two instructions in parallel. A more complex system might issue up to four instructions in parallel. In general, the technique can be used with an issue stage capable of issuing up to N instructions in parallel and where the issue stage selects a next set of instructions to issue in parallel from among a set of N next instructions within the interleaved stream of instructions. As the instructions have already been interleaved, the issue stage may check only the next N instructions in the interleaved stream. This reduces the complexity and overhead associated with a system in which the queues for each thread are still separate at the issue stage and where the issue stage may have to compare up to N instructions from within each thread in order to select which instructions are to be issued in parallel.

The checks performed by the issue stage when selecting instructions to issue in parallel can take a wide variety of different forms and may include one or more checks comprising an operand ready check for an instruction, an operand forwarding check for an instruction, a structural hazard check and a data dependency cross-check between instructions.

In advantageously simple and direct embodiments there will be provided a decode stage disposed between the fetch stage including the instruction interleaving circuitry and the issue stage.

Viewed from another aspect the present invention provides a multi-threaded in-order superscalar processor having an instruction pipeline comprising:

a plurality of fetched instruction queues in to which instructions from respective program threads are placed;

an issue stage responsive to instructions to select one or more of said instructions to be issued in parallel to respective execution units; and dependency hint circuitry disposed outside and upstream of said issue stage in said instruction pipeline, said dependency hint circuitry being coupled to at least one of said plurality of fetched instruction queues and responsive to at least two instructions adjacent in program order and stored therein to selectively associate hint data with a marked instruction, said hint data indicating that said marked instruction has no data dependency upon any other instruction of said at least two instructions; wherein said hint data for said marked instruction indicates that said marked instruction should not be issued in parallel with any other instructions of said at least two instructions unless said hint data indicates no data dependency thereupon.

One form of checking that is conventionally performed within the issue stage when determining which instructions can issue in parallel is checking for data dependency. The issue stage is normally downstream of the decode stage and accordingly the nature of the instructions is known at the issue stage and a precise determination can be made regarding what data dependencies are present. The present technique moves away from this conventional approach by moving the data dependency checking upstream of the issue stage and associating hint data with the instructions such that this hint data can be used to prevent parallel issue of instructions potentially having an inappropriate data dependency. The technique further recognises that the determination need not be fully precise and exhaustive. The technique identifies those instructions which it can positively verify are capable of being issued in parallel. The hint data can mark other instructions such that they will not be issued in parallel. This may result in some instructions which would be capable of parallel issue not being issued in parallel. However, the advantages associated with moving this hint data generation and data dependency checking out of the issue stage and upstream in the instruction pipeline outweigh the disadvantages of a number of instructions being prevented from parallel issue when they were in fact capable of parallel issue. The hint data effectively errs on the side of safety in preventing parallel issue unless it can be positively determined that there is no data dependency for the instructions concerned.

It will be appreciated that the issue stage can have a variety of different issue widths. A simple system as previously discussed may only be capable of dual issue. A more complex system may be more capable of wider parallel issue. The data dependency checking performed by the hint generation circuitry will examine a group of instructions corresponding to at least the maximum number capable of parallel issue to ensure that no data dependency exists for a particular instruction if it were to be parallel issued in combination with the other instructions in its group.

The hint dependency circuitry can be responsive to bit positions within the at least two instructions corresponding to the register specifying fields within at least some instruction encodings in order to identify whether a data dependency is present. Thus, for example, source register specifying fields in one instruction can be compared against destination specifying register fields in an earlier instruction. If there is no match, then there is no data dependency in this comparison.

It will be appreciated that the way in which data dependencies can manifest themselves in instructions can vary, such as the positions of source and destination register specifying fields can vary depending upon the encoding of the instructions concerned. In order to deal with this the hint generation circuitry can serve to at least partially decode the instructions to be subject to the data dependency checking, such as to confirm they are of a particular type in which the register specifying field locations are as expected and can be validly checked by other parts of the hint generation circuitry. The hint generation circuitry can thus target particular common types of instructions to generate hint data to allow their parallel issue when no data dependency exists. Less common instructions may not be targeted by the hint generation circuitry and accordingly will be marked with hint data which prevents their parallel issue by default. However, since such instructions normally will be less common, the performance loss will be more than compensated for the reduction in complexity and the higher overall speed of operation which may be achieved with the present technique.

The hint data can be associated with its instruction in a variety of different ways, such as being passed in its own separate queue down the pipeline. However, in preferred embodiments the hint data is associated with the marked instruction within the fetched instruction queue and moves together with that marked instruction along the fetched instruction queue.

It may be that hint generation is only performed for some of the fetched instruction queues, such as queues known to contain the high priority threads. However, flexibility and performance is improved when the hint generation circuitry operates on all of the fetched instruction queues.

Whilst, as discussed above, the present technique is capable of being used with systems having a variety of different issue widths, the balance between the additional complexity of the hint generation circuitry weighed against the performance enhancement it provides are particularly strong within a dual issue system in which the issue stage is capable of issuing up to two instructions in parallel.

The hint generation circuitry can be used in combination with the previously discussed thread interleaving circuitry in its variety of different forms. Such a combination synergistically provides a boost in performance within a multi-threaded in-order superscalar processor and yet does not significantly increase the circuit overhead or introduce problematic critical paths within the issue stage of the instruction pipeline.

Viewed from a further aspect the present invention provides a method of operating a multi-threaded in-order superscalar processor having an instruction pipeline, said method comprising the steps of:

placing fetched instructions from respective program threads in a plurality of a fetched instruction queues;

selecting one or more of said instructions to be issued in parallel to respective execution units by an issue stage; and using thread interleaving circuitry disposed outside and upstream of said issue stage in said instruction pipeline and coupled to said plurality of fetched instruction queues to receive therefrom instructions from different respective program threads and to form an interleaved stream of instructions from therefrom, said interleaved stream of instructions being supplied to said issue stage.

Viewed from a further aspect the present invention provides a method of operating a multi-threaded in-order superscalar processor having an instruction pipeline, said method comprising the steps of:

placing instructions from respective program threads within a plurality of fetched instruction queues;

selecting one or more of said instructions to be issued in parallel to respective execution units by an issue stage; and using dependency hint circuitry disposed outside and upstream of said issue stage in said instruction pipeline, said dependency hint circuitry being coupled to at least one of said plurality of fetched instruction queues and responsive to at least two instructions adjacent in program order and stored therein, to selectively associate hint data with a marked instruction, said hint data indicating that said marked instruction has no data dependency upon any other instruction of said at least two instructions; wherein said hint data for said marked instruction indicates that said marked instruction should not be issued in parallel with any other instructions of said at least two instructions unless said hint data indicates no data dependency thereupon.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
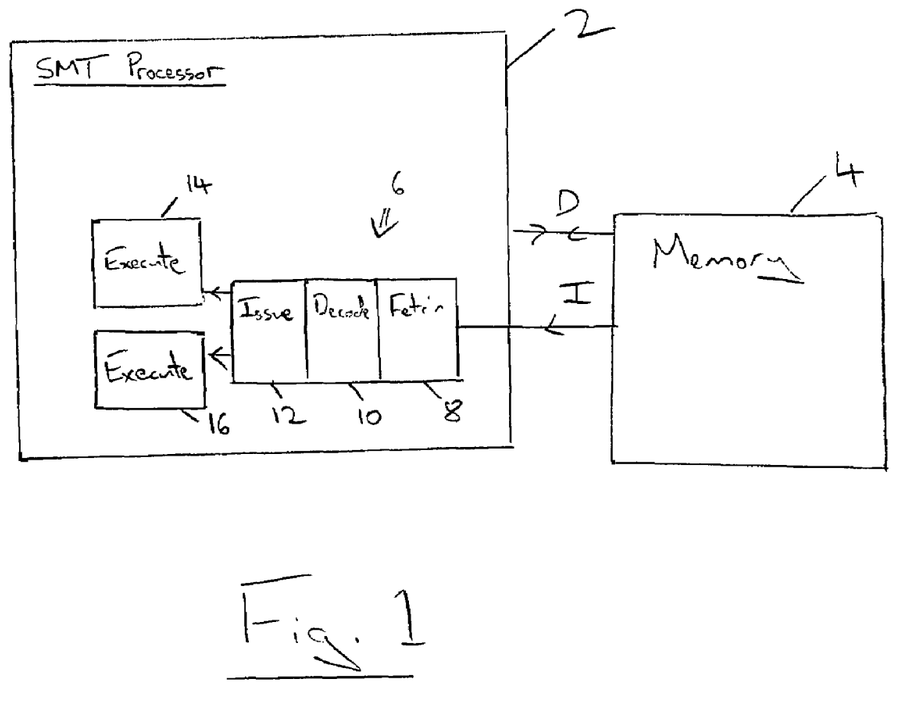
FIG. 1 schematically illustrates a multi-threaded in-order superscalar processor connected to a memory.

FIG. 1 shows a multi-threaded in-order superscalar processor 2 coupled to a memory 4. The memory 4 stores instructions I and data D which is supplied to the processor 2. The processor 2 includes an instruction pipeline 6 having a fetch stage 8, a decode stage 10, an issue stage 12 and multiple execution units 14, 16. The instructions from each program thread are executed in program order for that program thread. Thus, the instruction issue is statically scheduled with respect to each program thread when considered individually. The issue stage 12 can however select from which program thread instructions are to be taken and issued to none, one or both of the execute units 14, 16. It may be that the pending instructions currently being executed, or some memory access or other operation of the processor 2, have the effect that no instructions can be issued and the processor 2 is stalled. Alternatively, only one of the threads may be capable of issuing an instruction at that time and accordingly the issue stage 12 can select one program instruction from the thread which is ready to be issued. If both threads are ready, then the issue stage 12 can select one instruction from each thread or select both instructions from one thread, particularly if this is a higher priority thread.

Figure 2:
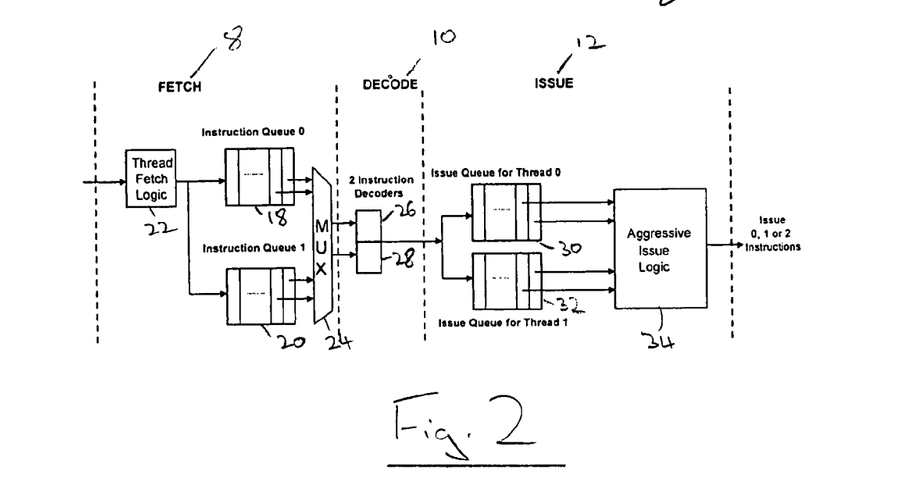
FIGS. 2, 3 and 4 schematically illustrate the difficulties which can be associated with aggressive issue control within the issue stage of an instruction pipeline.

FIG. 2 illustrates one example way in which the instruction pipeline 6 could be formed. In this example the fetch stage 8 includes two fetched instruction queues 18, 20 into which thread fetch logic fetches instructions I (of respective program threads) from the memory 4. The thread fetch logic 22 seeks to keep both of the fetched instruction queues 18, 20 at least partially full. A multiplexer 24 selects up to two instructions on each cycle to be passed in parallel through to two instruction decoders 26, 28. The selection of which instructions are to be decoded may be made based upon keeping the issue queues 30, 32 within the issue stage 12 both at least partially full such that there are decoded instructions for each thread available for issue. Issue control logic 34 selects either none, one or two instructions to be issued to the execute units 14, 16. The issue control logic 34 has to perform a variety of different checking operations before the instructions are issued. In particular, the checking operations can include an operand ready check for an instruction, an operand forwarding check for an instruction, a structural hazard check and a data dependency cross-check between instructions that can issue in parallel. This type of checking in itself will be familiar to those in this technical field.

Figure 3:
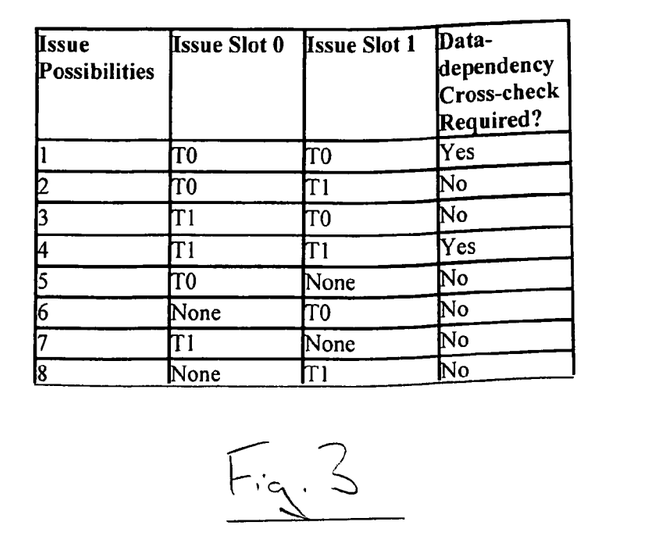

Since up to two instructions might be issued from one thread as well as the various mixed combinations and single issue combinations there exists a large number of possible combinations of instructions which can be issued and need be subject to a variety of different checking operations. FIG. 3 is a table illustrating those combinations of instruction issues which require a data-dependency cross-check to be performed. Such a data-dependency cross-check is performed when two instructions from the same thread are to be issued in parallel. It will be appreciated that the various checks to be performed could be supported by a large amount of circuitry operating in parallel, or alternatively could be performed by a lesser amount of circuitry performing more serialised processing by which the potential options for instruction issue are serially refined and not all checks need be performed in respect of all operations. Both approaches present their difficulties, both in terms of excessive circuitry requirements and undesirable processing delays.

Figure 4:
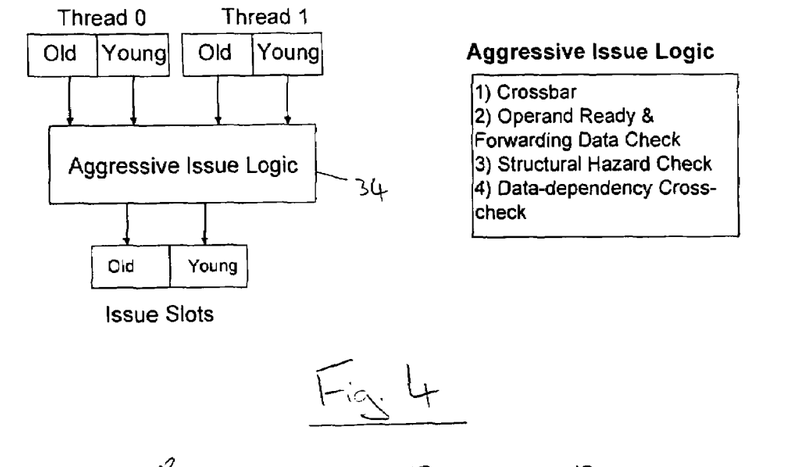

FIG. 4 schematically illustrates the issue control logic and the way in which it can select between an old and a young instruction from each of the two threads in order to fill its old and young issue slots to be issued to the execution units 14, 16. The issue control logic performs operand ready and data forwarding checks, structural hazard checks and data-dependency cross-checking. The issue control logic 34 also performs the function of crossbar switch by directing the appropriate instructions from the appropriate threads into the desired issue slots.

Figure 5:
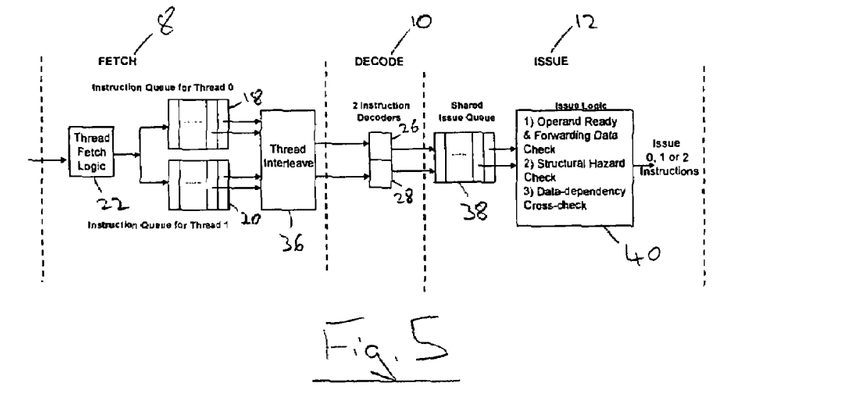
FIG. 5 illustrates an instruction pipeline including thread interleaving circuitry within the fetch stage.

FIG. 5 illustrates one example embodiment of the present technique in which the fetch stage 8 includes thread interleaving circuitry 36. The fetch stage 8 includes the thread fetch logic 22 and the two fetched instruction queues 18, 20. The thread interleaving circuitry 36 receives up to two instructions from each thread and selects which instructions are to be passed to the instruction decoders 26, 28 as an interleaved stream of instructions. Within the issue stage 12, there is provided a shared issue queue 38 into which the interleaved stream of instructions is placed. There is only a requirement for this one shared issue queue 38 and accordingly there is a reduction in hardware compared to the two issue queues 30, 32 illustrated in the alternative system of FIG. 2. Furthermore, the issue control logic 40 in this example embodiment is no longer required to provide the crossbar function since the selection of instructions between the different threads has already been performed. Thus, the issue control logic 40 will examine the next two instructions within the interleaved instruction stream and determine whether both can be issued in parallel or only one of them is capable of issue. It is also possible that neither may be issued due to some stalling condition.

Figure 6:
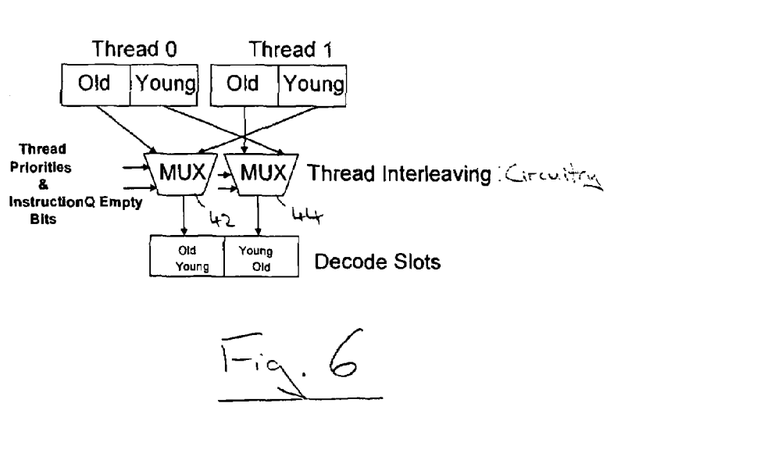
FIG. 6 illustrates a portion of the thread interleaving circuitry.

FIG. 6 schematically illustrates the thread interleaving circuitry 36 disposed within the fetch stage 8 in more detail. The thread interleaving circuitry 36 can be considered to be formed of multiplexers 42, 44 which each serve to select either the oldest instruction from one thread or the youngest instruction from the other thread to be placed into the slot for decoding within the interleaved instruction stream which is provided by the output from the respected multiplexer 42, 44. Thus, multiplexer 42 can select either the old instruction from Thread 0 or the young instruction from Thread 1. The multiplexer 44 can select either the old instruction from Thread 1 or the young instruction from Thread 0. The switching of the multiplexers 42, 44 is controlled by signals indicating whether either of the fetched instruction queues 18, 20 is empty and signals indicating the relative thread priorities of the two threads Thread 0 and Thread 1. The different threads each use their own slot numbering so that the in-order relationship within each thread can be maintained in the interleaved queue formed by the multiplexers 42, 44.

Figure 7:
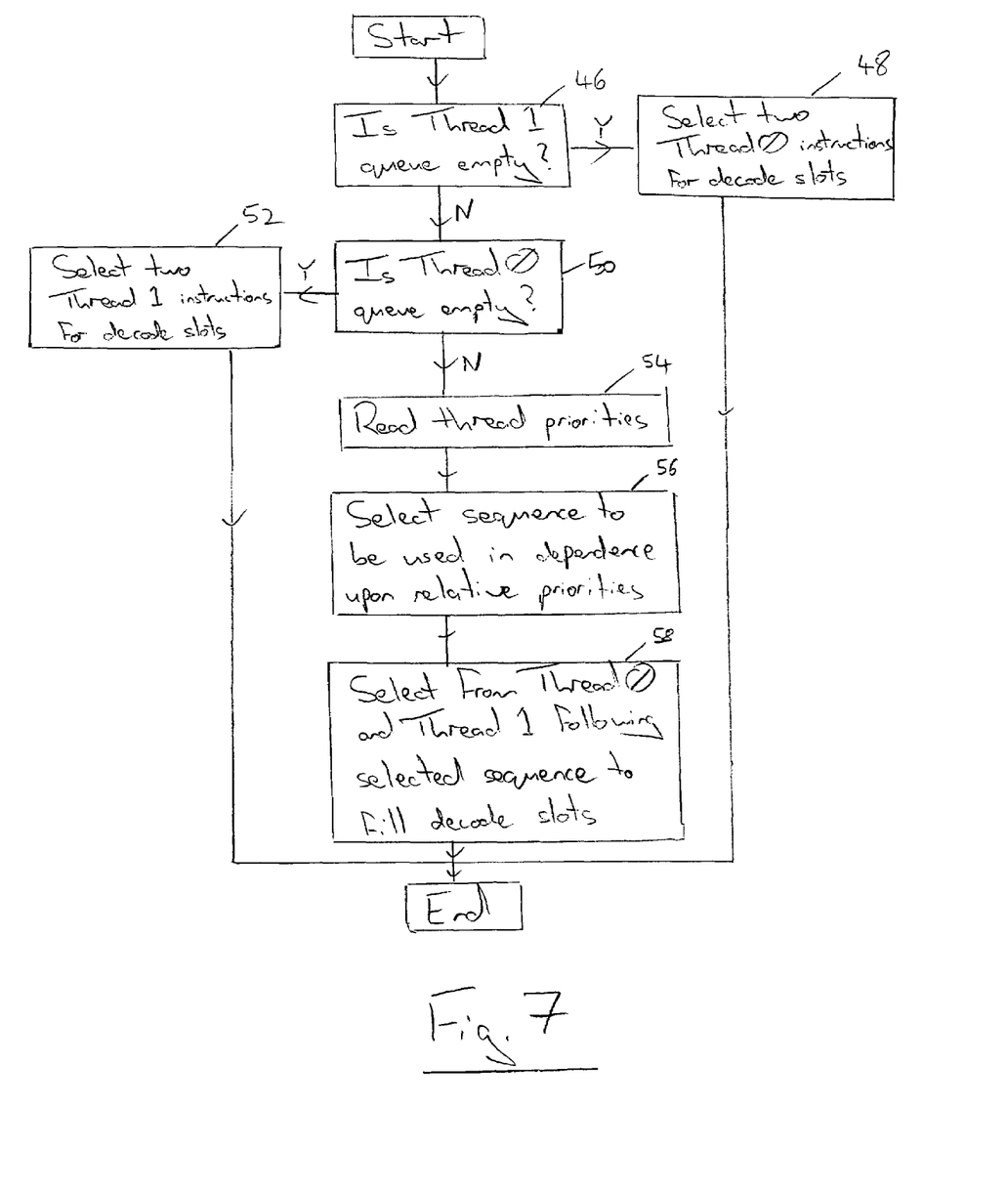
FIG. 7 is a flow diagram schematically illustrating how thread interleaving may be controlled in one example embodiment.

FIG. 7 is a flow diagram schematically illustrating how the switching of the multiplexers 42, 44 may be controlled so as to form the interleaved instruction stream in accordance with a selection sequence. At step 46 a determination is made as to whether Thread 1 queue is empty. If Thread 1 queue is empty, then step 48 selects two instructions from Thread 0 for the decode slots. In a similar way step 50 determines whether Thread 0 queue is empty and if it is empty, then step 52 selects two Thread 1 instructions for the decode slots. It will be appreciated that this simplified example assumes that at least one of the fetched instruction queues 18, 20 does contain at least two instructions capable of being passed to the decode slots. If at step 48 or 52 it is determined that two instructions are not present, then one or zero instructions could be passed to the decode slots as appropriate.

If the determinations at step 46 and 50 were that neither fetched instruction queue 18, 20 is empty, then step 54 reads the relative thread priorities associated with the two threads. Step 56 then selects a sequence to be used for the selection in dependence upon the relatively priorities. If both priorities are equal, then the selection sequence may simply alternate one instruction at a time between the two threads. If one thread were of a marginally higher priority than the other then the selection sequence may favour a higher proportion of instructions being selected from the higher priority thread. If there were a large difference in priority, then it may be that only instructions from one of the threads would be selected until all of that thread had been executed or a change in priority occurred, at which time instructions from another of the threads would again be selected for the interleaved instruction stream. Step 58 implements the selected sequence with the appropriate proportion of instructions from each thread by controlling the multiplexers 42 and 44 to fill the decode slots.

Figure 8:
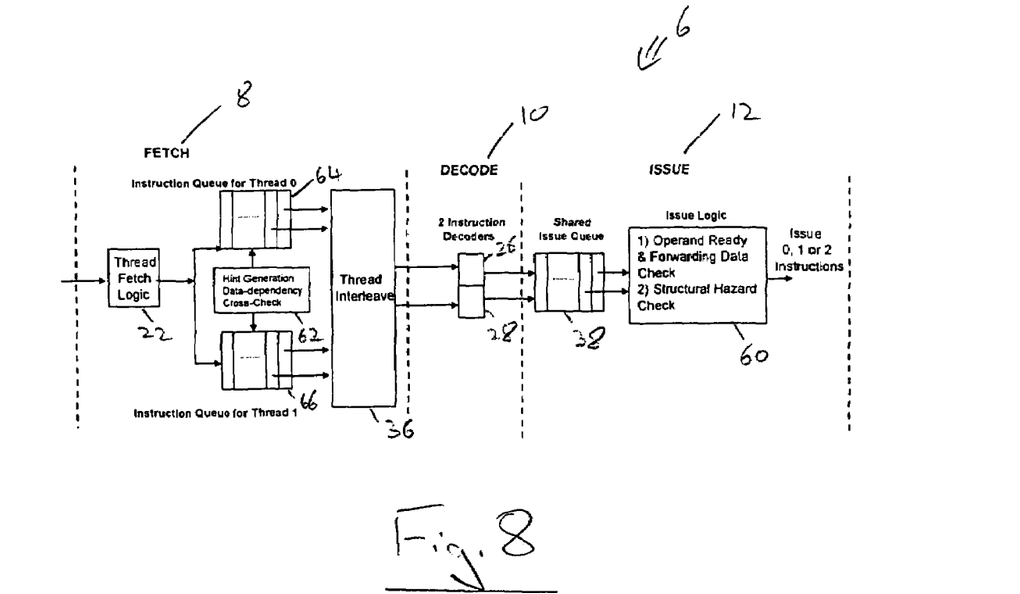
FIGS. 8 and 9 schematically illustrate hint generation circuitry within the fetched stage of an instruction pipeline.

FIG. 8 illustrates a further refinement of the instruction pipeline 6. In this illustrated example embodiment, hint generation circuitry 62 has been added to the fetch stage 8 and is responsive to instructions held within the fetched instruction queues 64, 66 to generate hint data which is associated with the instructions concerned within the fetched instruction queues 64, 66 and passed together with these instructions along the fetched instruction queues 64, 66, through the decode stage 10 and into the shared instruction queue 38. The hint data added by the hint generation circuitry 62 indicates instructions which are verified as being capable of parallel issue with one or more other instructions (this can be, for example, indicated by the hint bit being set to "1"). In this example with a dual issue processor, each instruction is marked as to whether or not it is capable of being executed in parallel with the preceding instruction in the program order. Thus, the issue control circuitry 60 can read the hint data and use this hint bit instead of having to perform its own data-dependency cross check. This simplifies the issue stage 12 and enables it to operate more rapidly and with less circuit overhead. It will be appreciated that with a system capable of wider parallel issue the hint data will indicate whether or not a given instruction is capable of parallel issue (at least as far as data-dependency is concerned) with those instructions with which it is capable of parallel issue given the maximum issue width and in-order constraints of the system. If the hint bit is set to "0", then this indicates that no instruction from the same thread should be coupled to that instruction and issued in parallel therewith. Rather, if possible, an instruction from another thread will be issued in parallel therewith. The issue stage can thus avoid the need to perform its own data-dependency cross-check.

Figure 9:
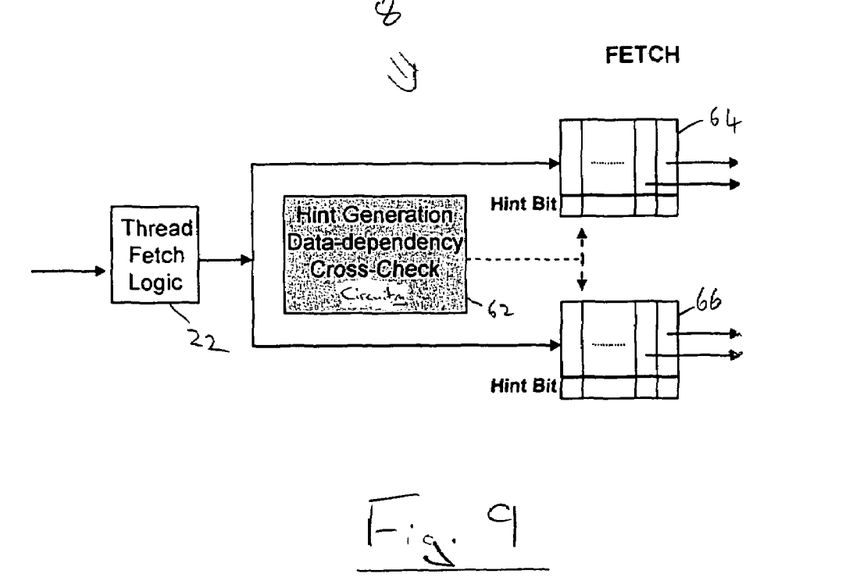

FIG. 9 illustrates the hint generation circuitry 62 in more detail. The hint generation circuitry 62 reads at least part of two instructions from each of the fetched instruction queues, 64, 66 and generates a hint bit to be added to a marked instruction being one of those instructions from each pair of instructions being compared. In one example the marked instruction can be the younger of a pair of instructions adjacent in the queue and the hint bit can indicate whether that younger instruction is capable of parallel issue with the older instruction. Alternatively, the marked instruction and the dependency could be indicated in the opposite sense with the older instruction being marked as to whether it is capable of parallel issue with the younger instruction. Once the hint bit is associated with an instruction within the fetch stage 8, it is passed along the queues with that instruction until it reaches the issue control circuitry 60. The issue control circuitry uses the hint bit to determine whether or not it will permit parallel issue of two instructions from the same thread within this dual issue example. The hint generation operation may be performed in parallel with sending the instructions to the decode stage 10.

As previously mentioned, the hint bit is an imprecise indication, at least in this example embodiment, of whether or not parallel issue is permitted. The degree of imprecision is controlled by the extent to which it is desired to decode the instruction as part of hint bit generation. It will normally be an acceptable compromise to generate hint bits indicating the allowability of parallel issue in respect of frequently occurring instruction types whereas relatively rare instruction types will default to hint bits preventing their parallel issue. This has the result of simplifying the hint generation circuitry 62 since it need not fully decode the instructions, but instead need identify instructions being of a particular type that is relatively common and for which it can make a positive determination that parallel issue is possible.

Figure 10:
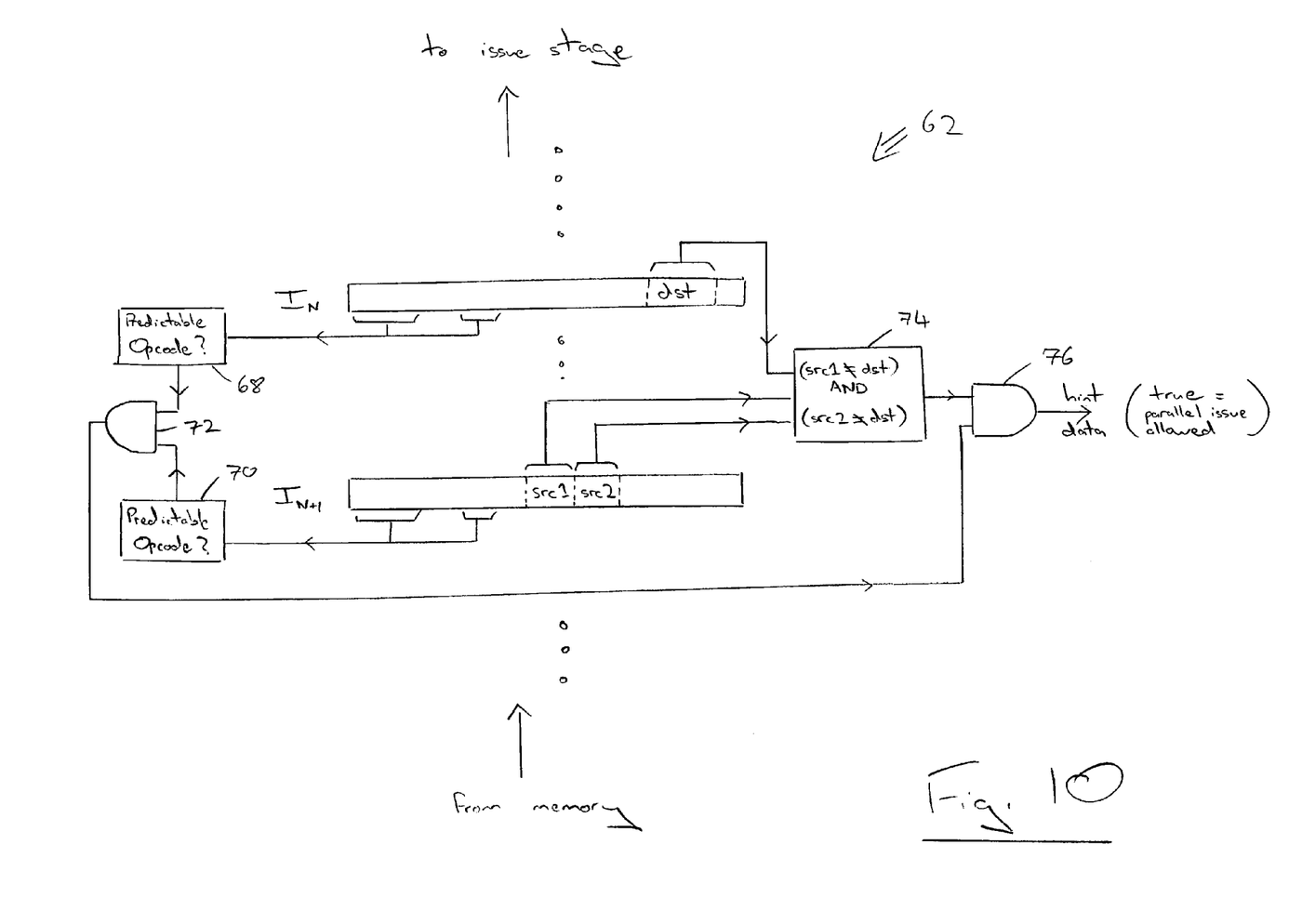
FIG. 10 schematically illustrates one example of how the hint generation circuitry may generate hint data.

FIG. 10 schematically illustrates a simple example of how the hint generation circuitry 62 may operate. The hint generation circuitry operates by comparing characteristics of two adjacent instructions within the fetched instruction queue 64, 66. These instructions can be taken from two fixed positions within the queue 64, 66, or may be drawn from a variety of positions if more circuitry is to be devoted to hint generation. Comparators 68, 70 are responsive to bits representing at least part of the encoding of the instructions $I_N$ and $I_{N+1}$ to determine whether or not these instructions correspond to the relatively common instruction types for which the hint generation circuitry 62 is to perform hint data generation. If both instructions are of a type which is capable of hint generation (i.e. a data dependency can be accurately identified/predicted), then this is indicated by the signal generated from AND gate 72.).

When both instructions are of a predictable type, then this indicates that the source register fields and destination registers fields for the two instructions will be at known positions within those instructions. Accordingly, those register specifying fields can be read and compared within comparison logic 74 and a determination made that the destination of the younger instruction $I_N$ does not match either of the source registers for the younger instruction $I_{N+1}$. If there is no data dependency identified by the comparator 74 and the instructions were of a type where such a dependency could have been identified, then this is indicated by the output of the AND gate 76. A true (high) output from the AND gate 76 corresponds to hint data indicating that parallel issue of the two instructions $I_N$ and $I_{N+1}$ is possible.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A multi-threaded in-order superscalar processor having an instruction pipeline comprising:
    a plurality of fetched instruction queues in to which instructions from respective program threads are placed;
    an issue stage responsive to instructions to select one or more of said instructions to be issued in parallel to respective execution units; and
    dependency hint circuitry disposed outside and upstream of said issue stage in said instruction pipeline, said dependency hint circuitry being coupled to at least one of said plurality of fetched instruction queues and responsive to at least two instructions adjacent in program order and stored therein to selectively associate hint data with a marked instruction, said hint data indicating that said marked instruction has no data dependency upon any other instruction of said at least two instructions; wherein
    said hint data for said marked instruction indicates that said marked instruction should not be issued in parallel with any other instructions of said at least two instructions unless said hint data indicates no data dependency thereupon.

2. A multi-threaded in-order superscalar processor as claimed in claim 1, wherein said dependency hint circuitry does not associate hint data indicating no data dependency with at least some instructions where there is no data dependency.

3. A multi-threaded in-order superscalar processor as claimed in claim 1, wherein said dependency hint circuitry is responsive to bit positions within said at least two instructions corresponding to register specifying fields within at least some instruction encoding to identify that said marked instruction has no data dependency upon any other instruction of said at least two instructions.

4. A multi-threaded in-order superscalar processor as claimed in claim 1, wherein said dependency hint circuitry at least partially decodes said at least two instructions as part of identifying that said marked instruction has no data dependency upon any other instruction of said at least two instructions.

5. A multi-threaded in-order superscalar processor as claimed in claim 1, wherein said hint data is written in to said at least one fetched instruction queue and moves with said marked instruction along said at least one fetched instruction queue.

6. A multi-threaded in-order superscalar processor as claimed in claim 1, wherein said dependency hint circuitry is responsive to different sets of instructions adjacent in program order and stored within said at least one fetched instruction queue such that each instruction stored within said at least one fetched instruction queue can be serve as said marked instruction and have hint data associated therewith.

7. A multi-threaded in-order supersealar processor as claimed in claim 1, wherein said dependency hint circuitry is coupled to all of said plurality of fetched instruction queues and associates hint data with respective instructions stored therein.

8. A multi-threaded in-order superscalar processor as claimed in claim 1, wherein said issue stage is capable of issuing up to two instructions in parallel and said dependency hint circuitry is responsive to said marked instruction and one adjacent instruction in program order to determine what hint data should be associated with said marked instruction.

9. A multi-threaded in-order superscalar processor as claimed in claim 1, comprising
    thread interleaving circuitry disposed outside and upstream of said issue stage in said instruction pipeline and coupled to said plurality of fetched instruction queues to receive therefrom instructions from different respective program threads and to form an interleaved stream of instructions from therefrom, said interleaved stream of instructions being supplied to said issue stage.

10. A multi-threaded in-order superscalar processor as claimed in claim 9, wherein said issue stage comprises an interleaved instruction queue having said interleaved stream of instructions as an input thereto, said issue stage selecting instructions to be issued from within said interleaved instruction queue.

11. A multi-threaded in-order superscalar processor as claimed in claim 9, wherein said thread interleaving circuitry forms said interleaved stream of instructions by selecting instructions from different ones of said plurality fetched instruction queues in accordance with a selection sequence.

12. A multi-threaded in-order superscalar processor as claimed in claim 11, wherein said selection sequence does include selecting from any fetched instruction queues not containing any instructions.

13. A multi-threaded in-order superscalar processor as claimed in claim 1, wherein different program threads have different associated priorities and said selection sequence is dependent upon said different associated priorities such that instructions from a program thread having a first priority are selected to form a greater proportion of said interleaved stream of instructions than instructions from a program thread having a second priority, said first priority being a higher priority than said second priority.

14. A multi-threaded in-order superscalar processor as claimed in claim 1, wherein said dependency hint circuitry and said plurality of fetched instruction queues are disposed within a fetch stage of said instruction pipeline.

15. A multi-threaded in-order superscalar processor as claimed in claim 14, wherein said thread interleaving circuitry is disposed within said fetch stage of said instruction pipeline.

16. A multi-threaded in-order superscalar processor as claimed in claim 9, wherein said issue stage is capable of issuing up to N instructions in parallel and said issue stage selects a next set of instructions to issue in parallel from among a set of N next instructions within said interleaved stream of instructions.

17. A multi-threaded in-order superscalar processor as claimed in claim 9, wherein said issue stage selects instructions to issue in parallel in dependence one or more checks including:
(i) an operand ready check for an instruction;
(ii) an operand forwarding check for an instruction; and
(iii) a structural hazard check.

18. A multi-threaded in-order superscalar processor as claimed in claim 14, wherein said instruction pipeline includes a decode stage disposed between said fetch stage and said issue stage.

19. A method of operating a multi-threaded in-order superscalar processor having an instruction pipeline, said method comprising the steps of:
placing instructions from respective program threads within a plurality of fetched instruction queues;
selecting one or more of said instructions to be issued in parallel to respective execution units by an issue stage; and
using dependency hint circuitry disposed outside and upstream of said issue stage in said instruction pipeline, said dependency hint circuitry being coupled to at least one of said plurality of fetched instruction queues and responsive to at least two instructions adjacent in program order and stored therein, to selectively associate hint data with a marked instruction, said hint data indicating that said marked instruction has no data dependency upon any other instruction of said at least two instructions; wherein
said hint data for said marked instruction indicates that said marked instruction should not be issued in parallel with any other instructions of said at least two instructions unless said hint data indicates no data dependency thereupon.

20. A method as claimed in claim 19, wherein said dependency hint circuitry does not associate hint data indicating no data dependency with at least some instructions where there is no data dependency.

21. A method as claimed in claim 19, wherein said dependency hint circuitry is responsive to bit positions within said at least two instructions corresponding to register specifying fields within at least some instruction encoding to identify that said marked instruction has no data dependency upon any other instruction of said at least two instructions.

22. A method as claimed in claim 19, wherein said dependency hint circuitry at least partially decodes said at least two instructions as part of identifying that said marked instruction has no data dependency upon any other instruction of said at least two instructions.

23. A method as claimed in claim 19, wherein said hint data is written in to said at least one fetched instruction queue and moves with said marked instruction along said at least one fetched instruction queue.

24. A method as claimed in claim 19, wherein said dependency hint circuitry is responsive to different sets of instructions adjacent in program order and stored within said at least one fetched instruction queue such that each instruction stored within said at least one fetched instruction queue can be serve as said marked instruction and have hint data associated therewith.

25. A method as claimed in claim 19, wherein said dependency hint circuitry is coupled to all of said plurality of fetched instruction queues and associates hint data with respective instructions stored therein.

26. A method as claimed in claim 19, wherein said issue stage is capable of issuing up to two instructions in parallel and said dependency hint circuitry is responsive to said marked instruction and one adjacent instruction in program order to determine what hint data should be associated with said marked instruction.

27. A method as claimed in claim 19, comprising
using thread interleaving circuitry disposed outside and upstream of said issue stage in said instruction pipeline and coupled to said plurality of fetched instruction queues to receive therefrom instructions from different respective program threads and to form an interleaved stream of instructions from therefrom, said interleaved stream of instructions being supplied to said issue stage.

28. A method as claimed in claim 27, wherein said issue stage comprises an interleaved instruction queue having said interleaved stream of instructions as an input thereto, said issue stage selecting instructions to be issued from within said interleaved instruction queue.

29. A method as claimed in claim 27, wherein said thread interleaving circuitry forms said interleaved stream of instructions by selecting instructions from different ones of said plurality fetched instruction queues in accordance with a selection sequence.

30. A method as claimed in claim 29, wherein said selection sequence does include selecting from any fetched instruction queues not containing any instructions.

31. A method as claimed in claim 29, wherein different program threads have different associated priorities and said selection sequence is dependent upon said different associated priorities such that instructions from a program thread having a first priority are selected to form a greater proportion of said interleaved stream of instructions than instructions from a program thread having a second priority, said first priority being a higher priority than said second priority.

32. A method as claimed in claim 27, wherein said dependency hint circuitry and said plurality of fetched instruction queues are disposed within a fetch stage of said instruction pipeline.

33. A method as claimed in claim 31, wherein said thread interleaving circuitry is disposed within said fetch stage of said instruction pipeline.

34. A method as claimed in claim 27, wherein said issue stage is capable of issuing up to N instructions in parallel and said issue stage selects a next set of instructions to issue in parallel from among a set of N next instructions within said interleaved stream of instructions.

35. A method as claimed in claim 27, wherein said issue stage selects instructions to issue in parallel in dependence one or more checks including:
    (i) an operand ready check for an instruction;
    (ii) an operand forwarding check for an instruction; and
    (iii) a structural hazard check.

36. A method as claimed in claim 33, wherein said instruction pipeline includes a decode stage disposed between said fetch stage and said issue stage.

37. A multi-threaded in-order supersealar processor having instruction pipeline means comprising:

a plurality of fetched instruction queue means in to which instructions from respective program threads are placed;

issue stage means for selecting in response to instructions one or more of said instructions to be issued in parallel to respective execution unit means; and dependency hint means disposed outside and upstream of said issue stage means in said instruction pipeline means, said dependency hint means being coupled to at least one of said plurality of fetched instruction queues and responsive to at least two instructions adjacent in program order and stored therein to selectively associate hint data with a marked instruction, said hint data indicating that said marked instruction has no data dependency upon any other instruction of said at least two instructions; wherein said hint data for said marked instruction indicates that said marked instruction should not be issued in parallel with any other instructions of said at least two instructions unless said hint data indicates no data dependency thereupon.

* * * * *